United States Patent
Schumacher

(10) Patent No.: US 8,945,333 B2
(45) Date of Patent: Feb. 3, 2015

(54) METHOD FOR APPLYING EDGE STRIPS ONTO NARROW SURFACES OF IN PARTICULAR PLATE-SHAPED WORK PIECES AND WORK PIECES OBTAINED IN SAID MANNER

(75) Inventor: Reinhard Schumacher, Preuβisch Oldendorf (DE)

(73) Assignee: Karl W. Niemann GmbH & Co. KG, PreuBisch Oldendorf (DE)

( * ) Notice: Subject to any disclaimer, the term of this patent is extended or adjusted under 35 U.S.C. 154(b) by 901 days.

(21) Appl. No.: 13/055,216

(22) PCT Filed: Jul. 6, 2009

(86) PCT No.: PCT/EP2009/004859
§ 371 (c)(1),
(2), (4) Date: Apr. 18, 2011

(87) PCT Pub. No.: WO2010/009805
PCT Pub. Date: Jan. 28, 2010

(65) Prior Publication Data
US 2011/0183122 A1      Jul. 28, 2011

(30) Foreign Application Priority Data

Jul. 21, 2008   (DE) .......................... 10 2008 034 115

(51) Int. Cl.
*B32B 3/08*      (2006.01)
*B29C 63/00*     (2006.01)
*B27D 5/00*      (2006.01)

(52) U.S. Cl.
CPC .............. *B29C 63/003* (2013.01); *B27D 5/003* (2013.01); *B29C 63/0065* (2013.01)
USPC ....................................................... 156/272.2

(58) Field of Classification Search
CPC .......... B32B 3/08; B32B 37/02; B32B 37/06; B32B 37/12; B32B 37/14; B29C 65/14
USPC ................................ 156/272.2, 272.6, 244.17
See application file for complete search history.

(56) References Cited

U.S. PATENT DOCUMENTS

2007/0017632 A1 *   1/2007   Toft et al. .................... 156/272.6
2010/0227128 A1 *   9/2010   Kramer et al. ............. 428/195.1

FOREIGN PATENT DOCUMENTS

DE         10144524 A1 *   3/2003
WO     WO 2009026977 A1 *   3/2009

* cited by examiner

*Primary Examiner* — Daniel McNally

(57) ABSTRACT

The invention relates to a method for applying edge strips (edge tape) onto narrow surfaces (narrow sides) of plate-shaped work pieces (material parts) by joining, wherein the edge strip is applied with a glue that can be activated by heat and is heated by plasma radiation. The invention further relates to the materials to which edge strips have been applied obtained in said way and to a device for carrying out said method.

20 Claims, 1 Drawing Sheet

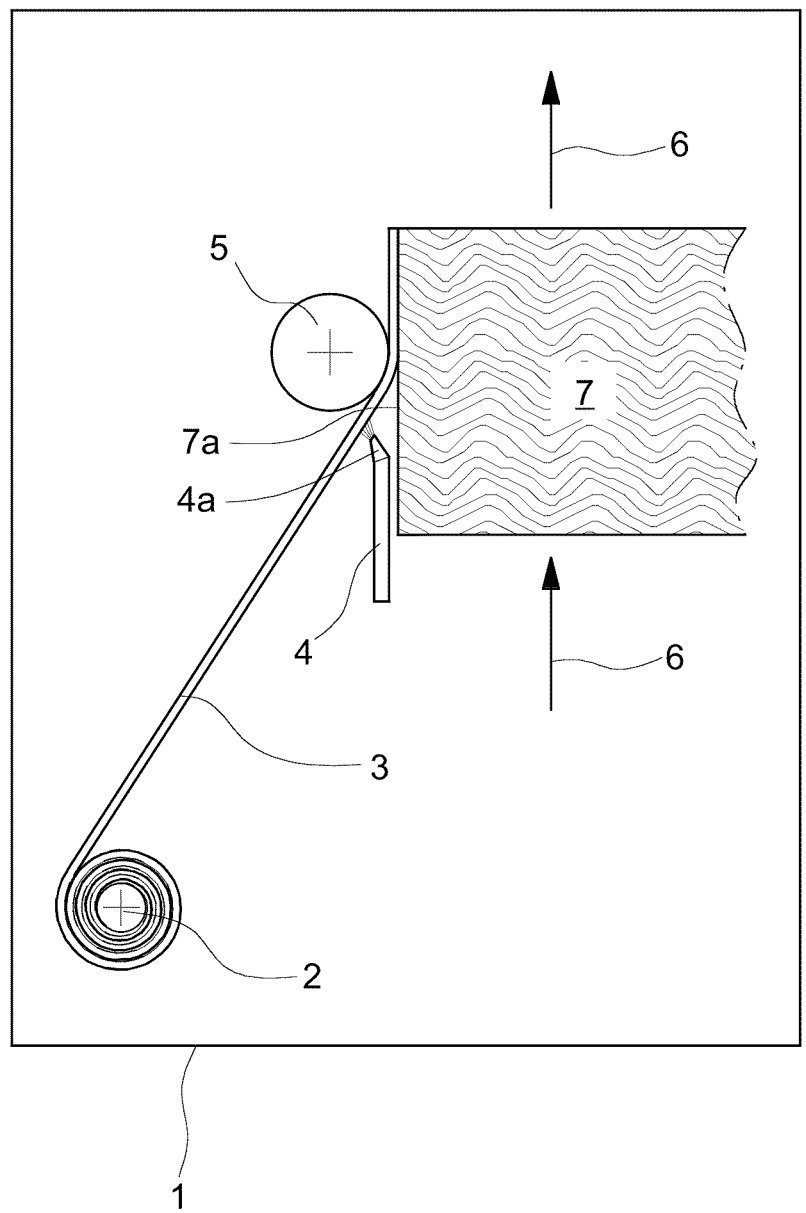

METHOD FOR APPLYING EDGE STRIPS ONTO NARROW SURFACES OF IN PARTICULAR PLATE-SHAPED WORK PIECES AND WORK PIECES OBTAINED IN SAID MANNER

CROSS-REFERENCES TO RELATED APPLICATIONS

This application is a National Stage filing of International Application PCT/EP 2009/004859, filed. Jul. 6, 2009, entitled "METHOD FOR APPLYING EDGE STRIPS ONTO NARROW SURFACES OF IN PARTICULAR PLATE-SHAPED WORK PIECES AND WORK PIECES OBTAINED IN SAID MANNER" claiming priority to German Application No. DE 10 2008 034 115.0, filed Jul. 21, 2008. The subject application claims priority to PCT/EP 2009/004859, and to German Application No. DE 10 2003 034 115.0, and incorporates all by reference herein, in their entirety.

BACKGROUND OF THE INVENTION

The present invention relates to the technology of attaching edge bands to the surface of workpieces.

More particularly the present invention relates to a method of attaching an edge band to at least one narrow face of an in particular panellike workpiece by jointing, and also to the workpieces obtainable by the method of the invention and to apparatus for carrying cut the method of the invention.

The present invention further relates to the use of a plasma for attaching edge bands to narrow faces of in particular panellike workpieces.

In the prior art there is a multitude of methods known for attaching edge bands to narrow faces of panellike workpieces.

Edge bands are conventionally attached in a through-travel machine, such as an edging machine, by means of an edge-gluing assembly, to the narrow faces of panellike workpieces. The edge band in question is supplied to this assembly, for example, from a magazine, and a hotmelt adhesive is applied to the narrow face of the workpiece usually immediately prior to the advancement of the edge band to the narrow workpiece face.

This is the method used at the present point in time to provide almost all workpieces with edge bands. The method is cost-effective and is suitable for producing relatively large unit numbers, but carries, with it a multitude of disadvantages. The melting of the hotmelt adhesive is energy-intensive and hence entails considerable cost. For example, up to half an hour elapses until an operating temperature of 150 to 210° C. is reached, and, moreover, energy is needed for the heating of the glue container in order to maintain this temperature. The adhesive is applied by rolling or knife coating to the workpiece, and as a result of this, when using chipboard panels, example, chips or pieces of wood may be torn from the workpiece and may therefore foul the roll or doctor blade, leading to a nonuniform and defective bond. Moreover, as a result of the roll or doctor blade application, the applied adhesive layer acquires a grid formation (i.e., so to speak, a pattern, therefore) and hence has a nonuniform thickness, leading in turn to a nonuniform bond. As a result of this, the bondline also becomes susceptible to the penetration of dirt and moisture, and so the bond is parted again over the course of time. Furthermore, when the adhesive is applied, the amount of adhesive needed is so great that, when the edge band is subsequently pressed against the workpiece, adhesive swells out of the bondline and hence contaminates not only the workpiece but also the processing machine. In order to prevent this, the workplace must be treated with release agents before the beginning of the method, and this is costly and inconvenient. On account of the described disadvantages of this method, a search has been on for some time for alternative possibilities for attaching edge bands to narrow faces of panellike workpieces.

Other methods of the prior art attempt to prevent, these disadvantages by using an edge band already coated with adhesive, where the coating or providing of the edge band with the hotmelt adhesive can be performed before the edge band is advanced to the narrow workpiece face. In this method, the adhesive is heated to a temperature above its melting temperature, and is held at that temperature. The hotmelt adhesive can be heated using, for example, hot air, infrared radiation or UV radiation, or microwaves. All methods have the disadvantage that the energy transfer to the adhesive is weak and that the heating of the hotmelt adhesive is therefore relatively protracted. These methods are therefore unsuitable for high throughputs or large unit numbers; moreover, the edge band must be very resistant to high temperatures, since all of the methods always entail tab edge band being highly heated as well. As a result of the cooling times that are therefore necessary, the production operation is drawn out even further, and only a very limited selection of materials are suitable for the production of the edge bands.

DE 10 2006 021 171 A1 describes an edge band identified as a cover strip, provided for attachment to a panellike workpiece and composed of an extrudable thermoplastic. In that strip the adhesive layer is applied to the edge band in the form of a hotmelt adhesive, by coextrusion, and accordingly it is necessary, for the purpose of affixing the edge band to the narrow face of the furniture panel in question, for the layer of hotmelt adhesive to be melted again, at least in regions. This is done by means of laser radiation directly in the course of affixing, and for this purpose a laser-compatible or laser-activatable adhesive layer is provided which can be melted or activated with the aid of the laser radiation.

With the laser radiation, the heat transport achieved is indeed more intensive than that possible with infrared radiation or with hot-air irradiation. The use of the laser-assisted coating method in an industrial manufacturing operation on a woodworking machine, however, is accompanied by considerable difficulties: for instance, costly and inconvenient safety measures must be taken in order to protect the operational staff from the laser radiation. The laser radiation must, furthermore, be absorbed by the layer of hotmelt adhesive, and this may be affected by transmission and reflection. The transparency of the hotmelt adhesive material, too, plays a part with regard to the optical depth of penetration, which is influenced by pigment particles and the like. The depth of penetration of the laser and the energy input by the laser must be selected such as on the one hand to provide for rapid heating of the adhesive layer but on the other hand such that the edge band does not suffer any damage due to excessive temperatures. Furthermore, using a laser unit for the outlined purpose is very cost-intensive, and connected with this is the fact that integration into an existing production line involves considerable difficulties. In particular, the operation of the laser unit is relatively energy-intensive and therefore not very economic.

BRIEF SUMMARY OF THE INVENTION

The present invention is now based on the object of providing a method for applying edge bands to narrow faces of workpieces, in particular panellike workpieces, which at least largely avoids or else at least alleviates the above-outlined disadvantages of the prior-art methods.

A further object on which the invention is based is that of providing edgebanded workpieces with enhanced quality, in particular better bonding, and also apparatus for carrying out the method of the invention.

In achievement of the object outlined above, the present invention, in accordance with a first inventive aspect, proposes a method for attaching an edge band (edge strip) to at least one narrow face (narrow side) of an in particular panellike workpiece (material part) by jointing, the edge strip being provided on its side to be joined to the workpiece (contact side) with a heat-activatable adhesive layer which is heated by irradiation prior to jointing; further advantageous embodiments are similarly described.

Further provided with the present invention, in accordance with a second inventive aspect, are the workpieces, in particular panellike workpieces, which have been provided on at least one of its narrow faces (narrow sides) with an edge band (edge strip), obtainable by the method of the invention.

Additionally provided with the present invention, in accordance with a third inventive aspect, is apparatus for attaching an edge band (edge strip) to at least one narrow face (narrow side) of an in particular panellike workpiece (material part) by jointing; further advantageous embodiments are similarly provided.

Finally, in turn, the present invention additionally provides the inventive use of a plasma for bonding edge bands (edge strips) and for heating and/or activating adhesives.

It will be appreciated that particular embodiments and design forms described only in connection with one aspect of the invention apply correspondingly in relation to the other aspects of the invention as well, without this being expressly described.

Besides, the skilled person is able to deviate, on an application basis or as occasioned by individual cases, from the number, value and/or range indications given below, without departing the scope of the present invention.

BRIEF DESCRIPTION OF THE DRAWINGS

FIG. 1 provides the sequence of the method of the invention, and the apparatus of the invention for edge band attachment.

DETAILED DESCRIPTION OF THE INVENTION

The present invention accordingly provides—in accordance with a first aspect of the present invention—a method for attaching an edge band (edge strip) to at least one narrow face (narrow side) of an in particular panellike workpiece (material part) by jointing, the edge band being provided on its side to be joined to the workpiece (contact side) with a heat-activatable adhesive layer which is heated by irradiation prior to jointing, where in accordance with the invention the heat-activatable adhesive layer is of plasma-activatable form, in particular the heat-activatable adhesive layer is provided with at least one energy-absorbing and/or thermally conducting substance, and where, in accordance with the invention, the heating of the heat-activatable adhesive layer takes place by means of plasma irradiation.

The concept of jointing in the context of the present invention refers in particular to methods which cause formerly separate workpieces to cohere, producing a new workpiece with an altered form. Specifically, in the context of the present invention, the concept of jointing refers to fusional jointing methods, especially adhesive bonding.

A heat-activatable adhesive layer in the context of the present invention means in particular a layer of at least one adhesive which through absorption of heat undergoes transition to an adhesive or tacky state, or whose constituents, as a result of absorption of heat, are cross linked with one another. In accordance with the invention it is preferred to use, as will be described later on, reactive and/or nonreactive hotmelt adhesives.

In the context of the present invention, the adhesive layer is heated to (and held at pending the jointing operation) temperatures at which the adhesive layer is in an adhesive or tacky, in particular heat-tacky, state. The operation of heating the adhesive layer takes place advantageously by means of plasma irradiation immediately prior to jointing, so as not to cause excessive thermal loading of the adhesive layer and edge band.

A plasma in the context of the present invention generally means, in particular, an at least partly ionized gas having free charge carriers, such as ions or electrons, for example. The plasma state is also called the fourth aggregate state—alongside the classic aggregate states of "solid", "liquid", and "gaseous"—and can be achieved by supplying energy to gaseous matter. The transition from the gaseous state to the plasma state can be accomplished in a variety of ways, as for example by thermal excitation, electrical discharges, absorption of electromagnetic radiation, electromagnetic fields, etc.

Plasmas and plasma technology possess a broad technical spectrum of application in the domestic and industrial spheres: thus, for example, plasmas are used in lighting (e.g., fluorescent and energy-saving lamps), surface technology (e.g., plasma etching, plasma-induced deposition of material, surface modification, and surface curing), and in materials processing (e.g., plasma cutting and arc welding). In the area of edge band processing and edge band coating, however, plasma technology has to date not been conceived of or realized as a suitable possibility for application.

Plasmas can be divided into various categories, on the basis, for example, of the pressure of the as from which they are produced. Distinctions are made between low-pressure plasma, normal plasmas (such as atmospheric-pressure plasma, for example), and high-pressure plasma.

Preferred in particular in accordance with the invention is an atmospheric plasma, i.e., a plasma which is generated under standard pressure and standard atmospheric conditions (in relation, for example, to the composition of the ambient air), or else a high-pressure plasma, for use. The plasma in this case may be generated, for example, in a plasma nozzle, traversed by a flow of dried compressed air, by application of a high-frequency high voltage, and passed out as a jet from the plasma nozzle through the compressed air. A plasma source of this kind, composed of plasma nozzle, high-voltage high-frequency generator, and compressed-air compressor, for example, is known per se to the skilled person and is sold, for example, by the company Plasmatreat GmbH of Steinhagen, Federal Republic of Germany.

The plasma used in the context of this invention preferably possesses an emission spectrum with intensity maxima in the UV range and in the IR range of the electromagnetic spectrum, in particular in the range from around 300 to 400 nm (UV range) and around 750 to 850 nm (IR range).

The energy component of the CV and IR radiation may vary within wide ranges as a proportion of the overall radiant energy of the plasma. Generally speaking, the fraction of the UV and IR radiation as a proportion of the total radiant energy of the plasma is at least 20%, in particular at least 40%, preferably at least 60%. In particular, the fraction of the CV and IR radiation as a proportion of the total radiant energy of the plasma is in the range from 20% to 95%, in particular 40% to 90%, preferably 60% to 85%. Nevertheless, for specific applications or in individual cases, it is not impossible that there may be deviation from the figures quoted above, without departing the scope of the present invention; deciding on this is within the expertise or judgement of the person skilled in this art.

By plasma activation should be understood, in the context of the present invention, that the adhesive layer or constituents of the heat-activatable adhesive layer are capable of absorbing, and converting into thermal energy, the energy which acts on the adhesive layer in the course of plasma irradiation. This relates not only to the energetic action of the particles of the plasma (molecules, molecular fragments, atoms, ions, electrons, etc.) but also to the energetic action of the emitted radiation (initiated, for example, by fragmentation of molecules and/or recombination of molecular fragments, ionization, atomic energy transitions, etc.).

A plasma-activatable adhesive layer is therefore a layer of an adhesive which is able to absorb the energy of the plasma and convert it into thermal energy. Constituents of the adhesive and/or admixtures or additives thus absorb energy reversibly, i.e., they absorb the energy of the plasma reversibly, convert it subsequently into thermal energy, and, ultimately, deliver this energy to their surroundings.

Preferably, in the context of the present invention, the edge band, immediately after the action of the plasma, is pressed onto the workpiece and joined with it (i.e., with its narrow side or face).

The method of the invention possesses a series of advantages which distinguish it from the methods of the prior art: the method of the invention is extremely cost-effective and permits high throughputs, i.e., it is suitable for industrial use with high unit numbers. As a result of the plasma activation of the adhesive layer, substantially less adhesive is required than with conventional, methods, and the bonding achieved is substantially more robust than with conventional methods; in particular, defective bonds are drastically reduced or excluded. The far lower application of adhesive in the method of the invention also prevents the swelling of the adhesive out of the bondline, which is customary in the prior art and which necessitates costly and inconvenient pretreatment and aftertreatment of the workpiece. Furthermore, as a result of the lower consumption of adhesive, substantially thinner bondlines are obtained, which are no longer visible to the naked eye and may also be referred to as invisible joints. Moreover, the bonds obtained are of enhanced quality, with higher peel strengths and greater imperviousness in particular. A further advantage is that the incorporation of a plasma source into an existing production line is a ready possibility, with the further factor that the costs for installing and operating the plasma source are comparatively low.

The stated advantages, which will be set out in more detail further later on, can all be causally attributed to the plasma treatment of the adhesive layer. Indeed, it has emerged in particular, surprisingly, that the plasma let possesses only a relatively low depth of penetration into the adhesive layer and causes very rapid heating only of a sufficient amount of adhesive as required for achieving a permanent bond. The edge band, in contrast, is heated substantially not at all or only to a small extent by the plasma irradiation, and so the workpiece can immediately be further-processed, without any need to wait for the edge band to cool first or for the adhesive to cure in a protracted procedure.

Generally speaking, when carrying out the method of the invention, it is possible in particular to use an edge band comprising a thermoplastic or thermoset or wood or paper or cardboard.

In the context of the invention it has proven particularly advantageous if said edge band used is an edge band comprising thermoplastic or thermoset, in particular based on (i) polyolefins, preferably polyethylene (PE) or polypropylene (PP); (ii) polymethacrylates (PMA); (iii) polymethyl methacrylates (PMMA); (iv) polyvinyl chloride (PVC); (v) polyvinylidene halide, in particular polyvinylidene fluoride (PVDF) or polyvinylidene chloride (PVDC); (vi) acrylonitrile/butadiene/styrene copolymer (ABS); (vii) polyamides (PA), polycarbonates (PC); (viii) melamine-formaldehyde resins; (ix) epoxy resins; (x) phenolic resins or (xi) urea resins.

In accordance with the invention, use may be made as workpiece of a workpiece of wood, wood substitutes, plastics or glass. In accordance with one particularly preferred embodiment of the present invention, a workpiece of wood or wood substitutes is used.

In the context of the invention, the term "wood substitutes" is to be understood primarily to refer to wood fiber materials, i.e., materials which comprise wood fibers as constituents, such as, for example, chipboard, MDF (Medium Density Fiber board) or OSB (Oriented Strand Board) panels. Also possible, though, is the use of a wood substitute based on a plastic, in which case plastics contemplated include all those suitable as materials for the edge bands.

In the context of the present invention, the plasma-activatable adhesive layer may comprise or consist of at least one hotmelt adhesive, in which case, preferably, reactive or non-reactive hotmelt adhesives may be employed.

It has emerged as being particularly advantageous if the plasma-activatable adhesive layer comprises at least one hotmelt adhesive based on olefins, in particular preferably amorphous poly-α-olefins (APAO), polyamides (PA), polyurethane elastomers (TPU), polyester elastomers (TPE), copolyamide elastomers (CoPa) and/or ethylene/vinyl acetate copolymers (EVA).

In particular it is also possible as adhesive layer to envisage a one-component or two-component polyurethane prepolymer which comprises reactive molecules which are still relatively short-chain molecules and which crosslink after the chemical reaction to give highly stable, long-chain molecules, the polymers.

As far as the thickness of the plasma-activatable adhesive layer is concerned, it may vary within wide ranges in the context of the present invention. Generally speaking, the plasma-activatable adhesive layer possesses a thickness of not more than 200 µm, in particular not more than 150 µm, preferably not more than 100 µm. In particular the thickness of the plasma-activatable adhesive layer is in the range from 0.1 to 200 µm, in particular 1 to 150 µm, preferably 2 to 100 µm. Insufficient thicknesses generally do not allow sufficient or reliable bonding or adhesion, whereas excessive thicknesses do not allow any further increase in the bonding or adhesion, but instead often result in poorer qualities of the jointed assembly, especially as a result of adhesive excess (e.g., swelling of the adhesive out of the bondline, etc.). Nevertheless, it is not possible to rule out, in particular applications or in certain cases, some deviation from the figures quoted above, without departing the scope of the present invention; deciding this is within the expert abilities and within the judgment of the person skilled in this art.

As far as the application rate of the plasma-activatable adhesive layer is concerned, it may also vary within wide ranges in the context of the present invention. Generally speaking, the plasma-activatable adhesive layer will be applied at a rate of not more than 300 g/m², in particular not more than 200 g/m², preferably not more than 150 g/m². In particular the plasma-activatable adhesive layer will be applied at an application rate in the range from 1 to 300 g/m², in particular 5 to 200 g/m², preferably 10 to 150 g/m². Here again, for particular applications or in certain cases, it is not possible to rule out deviating from the figures quoted above, without departing the scope of the present invention; deciding this is within the expertise and judgment of the person skilled in this art.

In the method of the invention, the edge band and the plasma-activatable adhesive layer may be joined to one another inseparably and/or permanently prior to the narrow workpiece side/edge band jointing operation. In particular it is possible to employ an edge band which has already been treated on its side to be joined to the workpiece (contact side) with the heat-activatable adhesive layer (i.e., a prefabricated or independently produced adhesive-treated edge band, then).

In this context it has proven particularly advantageous if the provision to the edge band of the plasma-activatable adhesive layer takes place or has taken place by coextrusion. Coextrusion of the edge band and of the plasma-activated adhesive layer, specifically, achieves a highly uniform provision to the edge band in conjunction with a minimal adhesive-layer thickness. As a result of the coextrusion, the adhesion of the adhesive layer to the edge band is better than with conventional methods, and so, usually, there is no need to use additional adhesion promoter (primer).

Only a plasma treatment, in turn, of the adhesive layer allows such thin adhesive layers to be heated specifically without at the same time heating the edge band or causing damage to it through development of heat.

Although the coextrusion of edge band and plasma-activatable adhesive layer is preferred in accordance with the invention, other embodiments too are possible. Thus, for example, the edge band may first be provided or coated with an adhesion promoter (primer), followed only then by the application of the adhesive layer in the form of an adhesive sheet, a solution or dispersion of an adhesive, or a liquid hotmelt adhesive. It is also possible, given an appropriate surface structure, to provide the edge band with an adhesive layer without using an adhesion promoter (primer) (e.g., after corona treatment and/or after roughing of that surface of the edge band that is to be provided with adhesive).

In accordance with the invention, the heat-activatable adhesive layer is provided with at least one energy-absorbing and/or thermally conducting substance, which will be described in more detail below.

In accordance with the invention it is possible for the energy-absorbing and/or thermally conducting substance of the adhesive layer to be energy-absorbing and thermally conducting.

According to one preferred embodiment of the present invention, the energy-absorbing and/or thermally conducting substance of the adhesive layer is capable of absorbing energy reversibly.

In this context it has proven particularly advantageous if the energy-absorbing and/or thermally conducting substance of the adhesive layer is an ingredient or (integral) constituent of the adhesive layer, in particular of the hotmelt adhesive.

According to one particular embodiment of the present invention, the energy-absorbing and/or thermally conducting substance of the adhesive layer comprises or consists of individual and/or discrete particles.

The thermally conducting particles integrated into the polymer of the heat-activatable adhesive layer may in particular be metal particles, whose distribution in the adhesive may preferably be uniform. Nonuniform distribution or a distribution with gradients is also contemplated when—depending on the thickness of the adhesive layer—for example, the zones that are situated further from the side acted on by the plasma jet are likewise still to be sufficiently heated, or else specifically this is not to be the case. This is dependent also on the thermal conductivity of the adhesive, and, furthermore, also on the extent to which the adhesive of the adhesive layer is to be plastified or liquefied only at the free upper side lying at a distance from the material of the edge band itself, or else in deeper-lying zones.

Thermally conducting particles contemplated for incorporation into the polymer of the adhesive layer include, in particular, metal particles, preferably aluminum particles.

The grain size of the thermally conducting particles is adapted to the particular thermal conductivity required for the adhesive layer as a whole. For instance, the metal particles may be mixed in the form of a powder or granules into the polymer of the adhesive layer and thereby incorporated therein.

Plasma-activatable adhesives suitable in the context of the present invention, in particular heat-activatable or plasma-activatable adhesives with energy-absorbing or thermally conducting substances, respectively, are available commercially and are sold by, for example, Jowat AG, of Detmold, Federal Republic of Germany.

The method of the invention may in principle be operated both as a continuous method, in particular as a through-travel method, and as a stationary method.

In the context of the present invention, a through-travel method means in particular a method for continuous machine flow. The workpieces are transported in a continuous flow, by means of a conveyor or belt installation, for example, to an edge affixing means, where they are provided with an edge band and depart the means, again, in a continuous flow of workpieces.

In contrast to this, a stationary method is carried out on a machining installation which is generally mobile (e.g., an edge-affixing means). For this purpose, the workpieces are transported individually to the machining station, where they are machined and then transported off again individually. Typically, during machining, the workpiece is at rest in the machining means, while parts of the machining means run along the workpiece; with the stationary method as well, however, it is possible for the workpiece to be diverted a number of meters from the position of rest in the course of the machining.

According to one preferred embodiment, the method of the invention is operated as a through-flow method, preferably in continuous operation.

The rate of advance with which the method of the invention is carried cut may vary within wide ranges in the context of the present invention. Generally speaking, the method of the invention is carried out with a rate of advance of at least 5 m/min, in particular at least 10 m/min, preferably at least 20 m/min, very preferably at least 30 m/min. In particular the method is carried out with a rate of advance in the range from 5 to 100 m/min, in particular 10 to 75 m/min, preferably 15 to 60 m/min, very preferably 20 to 50 m/min. Lower rates of advance would correspond to a stationary method, while a greater rate of advance is not possible to accomplish, at least at present, with the apparatus available on the market. Nevertheless, for particular applications or in certain cases, it is possible to deviate from the figures quoted above, without departing the scope of the present invention. The decision on this is for the person skilled in this field, within his or her expertise and judgment.

In the context of the method of the invention, therefore, as described above, the heat-activatable adhesive layer is heated by means of plasma irradiation, which will be described in more detail below.

In the context of the present invention, the plasma irradiation may take place by means of a plasma source, in particular by means of a plasma source having at least one and preferably two or more plasma nozzle (s).

As far as the temperature of the plasma, in particular on emergence from the plasma nozzle or nozzles, is concerned, it may, in the context of the present invention, vary within wide ranges. The temperature of the plasma, in particular on emergence from the plasma nozzle or nozzles, is preferably in the range from 200 to 1000'C, in particular 300 to 900° C., preferably 400 to 800° C. Nevertheless, in certain cases or for particular applications, it is possible to deviate from the figures quoted above, without departing the scope of the invention; deciding this is within the expertise and judgment of the person skilled in this art.

Similarly, the energy with which the plasma radiation acts on the plasma-activatable adhesive layer may vary within wide ranges. The plasma irradiation preferably acts with an energy of 0.5 to 20 kWh, in particular 1 to 10 kWh, on the plasma-activatable adhesive layer.

Depending on the energy of the plasma radiation, the electrical energy consumption of the plasma source may also vary within wide ranges in the context of the present invention. Generally speaking, for generating the plasma irradiation, a plasma source is used that has an electrical energy consumption of 0.5 to 20 kWh, in particular 1 to 10 kWh.

Here as well, nevertheless, in certain cases or for particular applications, it is possible to deviate from the specified figures for the energetic action of the plasma radiation on the plasma-activatable adhesive layer, and the electrical energy consumption of the plasma source, without departing the scope of the present invention; deciding this is within the expertise and judgment of the person skilled in this art.

According to one particularly preferred embodiment of the present invention, plasma irradiation takes place by means of a plasma source, in particular by means of a plasma source having at least one and preferably two or more plasma nozzles, the distance of the plasma source, in particular its nozzle(s), from the adhesive layer being set in the range from 0.5 to 20 mm, in particular 1 to 10 mm, preferably 2 to 8 mm, more preferably 3 to 6 mm.

In the context of the present invention it has proven advantageous if the jointing, in particular the attachment of the edge band to the narrow face, takes place with pressing. This is familiar as such to the skilled person.

Furthermore provided by the present invention in accordance with a second aspect of the present invention—in are the workpieces, in particular panel-like workpieces, which are provided with an edge band on at least one narrow face and are obtainable by the method of the invention.

The workpieces produced by the method of the invention differ significantly from the workpieces produced by substantially less adhesive is required when the method of the invention is carried out, i.e., the applied adhesive layer can be substantially thinner ("invisible joint"). As a result of the lower quantity of adhesive, there is no incidence of the effect whereby adhesive swells out of the bondline when the edge band is pressed, and contaminates the workpiece. In prior-art methods, this is prevented by the costly and inconvenient measure of pretreating the workpiece with a release agent and removing excess adhesive and release agent again in an aftertreatment. Furthermore, the thinner adhesive layer produces a narrower bondline, which is imperceptible or barely perceptible to the naked eye and is called an invisible joint. The invisible joint is not only aesthetically more appealing than conventional bondlines, but is also substantially more robust with respect to mechanical loads, owing to the smaller area of attack, and is therefore formulated as an objective in coating operations. Since, in accordance with the invention, the edge band and the plasma-activatable adhesive layer are produced preferably by coextrusion, the adhesive layer is extremely uniform and does not have a grid marking or a pattern, as in the case of knife coating or roller coating application of the adhesive, for example. As a result of this, the resultant bond is also extremely uniform and robust, and, in particular at its margins, does not have open-pore structures resulting from the mode of application. The resulting bonds are enhanced, having, in particular, enhanced peel strengths and enhanced imperviousness.

The bondline obtainable by the method of the invention is therefore substantially less susceptible to the penetration of moisture and dirt, and so the bond and hence also the workpieces possess a very much longer lifetime.

With this kind of plasma-activated bonding, furthermore, especially in the case of preceding coextrusion of edge band and adhesive layer, there is no need for previous adhesion promoter in order to prepare the edge band or else the workpiece for bonding. The method of the invention leads to extremely durable bonds, which are virtually free from defects. Surprisingly it has been found that the plasma activation significantly enhances not only the adhesion of the adhesive layer with a workpiece, but also the adhesion of the edge band to the adhesive layer.

Additionally provided by the invention—in accordance with a third aspect of the present invention—is an apparatus for attaching an edge band (edge strip) to at least one narrow face (narrow side) of an in particular panellike workpiece (material part) by jointing, in particular for carrying out the method according to the invention as described above, where the apparatus comprises at least one means for storing and/or preferably continuously dispensing an edge band, at least one energy source, preferably irradiation source, in particular for heating an edge band, preferably its adhesive coating, at least one pressing means for pressing an edge band against a narrow face of the workpiece, and at least one transport means for moving and/or transporting the workpiece, where the energy source is a plasma source.

As far as the number of plasma nozzles of the plasma source is concerned, their number may vary within wide ranges. Generally speaking, the plasma source has at least one nozzle and preferably two or more nozzles, in particular two to ten nozzles.

According to one particularly preferred embodiment of the apparatus of the invention, the plasma source, in particular its nozzle(s), is positionable between a narrow side of the workpiece and the edge hand, and/or the plasma source, in particular its nozzle(s), is displaceable, in particular displaceable in all spatial directions.

The distance of the plasma source, in particular its nozzle (s) from the edge band may vary within wide ranges. Generally speaking, the distance of the plasma source, in particular its nozzle (s), from the edge band, in particular its adhesive layer, is in the range from 0.5 to 20 mm, in particular 1 to 10 mm, preferably 2 to 8 mm, more preferably 3 to 6 mm. In individual cases or in particular applications, however, it is possible to deviate from the figures quoted above, without departing the scope of the present invention; deciding this is within the expertise and judgment of the person skilled in this field.

The plasma source ought to be capable of generating plasma temperatures, in particular on emergence from the nozzle or nozzles, of 200 to 1000° C., in particular 300 to 900° C., preferably 400 to 800° C.

Preferably the plasma source is capable of generating an energy of 0.5 to 20 kWh, in particular 1 to 10 kWh.

The plasma source of the apparatus of the invention may have an electrical energy consumption of 0.5 to 20 kWh, in particular 1 to 10 kWh.

The single FIGURE shows, diagrammatically, the sequence of the method of the invention, and the apparatus of the invention for edge band attachment:

In accordance with the depiction in the single FIGURE, the apparatus 1 of the invention for attaching an edge band or edge strip 3 to at least one narrow face or narrow side 7a of an in particular panellike workpiece or material part 7 by jointing comprises at least one means 2 for storing and/or preferably continuously dispensing an edge band 3, and at least one energy source 4, preferably irradiation source, in particular for heating an edge band 3, preferably its coating of adhesive, and further comprises at least one pressing means 5 for pressing an edge band 3 onto a narrow face 7a of the workpiece 7, and also at least one transport means 6 for moving or transporting the workpiece 7, the energy source 4 being a plasma source or being designed as a plasma source.

As the depiction in the FIGURE shows, the plasma source 4 has at least one nozzle 4a, preferably two or more nozzles 4a, in particular two to ten nozzles 4a. The plasma source 4, in particular its nozzle (s) 4a, is positioned or positionable between a narrow side 7a of the workpiece 7 and the edge band 3. In particular the plasma source 4, in particular its nozzle (s) 4a, is displaceable, in particular displaceable in all spatial directions.

For further details in this respect in relation to the apparatus of the invention, reference may be made to the above observations concerning the method of the invention.

As is evident from the diagrammatic depiction in the FIGURE, the process, of the method of the invention is typically as follows: the edge band 3 is delivered, preferably continuously, from the relevant storage and delivery means 2, in particular in a through-flow process, from where it passes the nozzle (s) 4a of the plasma source 4, and so the coating of adhesive on the contact side of the edge band 3 is melted and is subsequently pressed by means of the pressing means 5 onto the narrow face 7a of the workpiece 7, which is advanced by means of the transport means 6, and so the edge band 3 can be attached length by length onto the narrow face 7a. For further details in this respect concerning the process in the method of the invention, reference may be made, in order to avoid unnecessary repetition, to the observations above.

Additionally provided with the present invention—in accordance with a fourth aspect of the present invention—is the use of a plasma and/or plasma irradiation for bonding edge bands (edge strips) to the narrow faces (narrow sides) or in particular panellike workpieces (material parts).

In accordance with the invention it has proven particularly advantageous if a plasma and/or plasma irradiation is used for heating and/or activating adhesives in the attachment of edge bands (edge strips) to the narrow faces (narrow sides) of in particular panellike workpieces (material parts).

The method of the invention and the use in accordance with the invention, and also the apparatus of the invention, possess a multitude of advantages, which are to be considered an indication of patent eligibility:

The depth of penetration of the plasma jet can be adjusted with great precision, and so the edge band is at least substantially not heated, heating taking place, instead, only of the plasma-activatable joining layer or adhesive layer. The coated workpiece can therefore be further-processed—milled, for example—immediately.

When the method of the invention is used, there are no defects such as inadequate bonds as a result of adhesive which is too cold or too hot or has even become burnt.

Since the plasma-activatable joining layer or adhesive layer is activated directly, there is at least substantially no indirect heating through the edge band, and so, comparatively little energy is required. The energy consumption is generally 1 to 2 kWh (in comparison to around 90 kWh in the case of the heat treatment of an adhesive layer by means of laser treatment).

The edge band and the workpiece are joined immediately. As a result of the removal of cooling time, downtimes are optimized.

As a result of the direct and rapid heating of the adhesive layer, it is possible to process a much greater spectrum of adhesives than in prior-art methods.

The plasma, in particular its temperature or radiant energetic output, need not be tailored, expensively and inconveniently, to each individual adhesive, but instead can be employed universally.

In comparison to conventional adhesive layers, the plasma-activatable adhesive layer is very thin, and so there is virtually no perceptible joining seam, and a virtually jointless joining is possible ("invisible joint").

As a result of the rapid curing of the relatively thin adhesive layer, the downstream milling means for flush-milling the edge band does not become clogged or contaminated with uncured adhesive.

The method is suitable even in regions of high atmospheric humidity. Moreover, the loin of the edge band to the surface of the workpiece is highly resistant to heat and cold.

The distance between the plasma nozzle and the jointing face can be selected with considerable tolerance, and is situated in the range from 0.5 to 20 millimeters.

The method is not very safety-critical: on skin contact with the plasma jet, minor skin burns occur. In comparison to this, the use of laser canons necessitates costly and inconvenient shielding.

The apparatus of the invention, moreover, is not susceptible to frequent maintenance, and, furthermore, can also subsequently be readily integrated or installed into existing lines of the prior art.

Further embodiments, modifications, variations, and advantages of the present invention are readily apparent to and realizable by the skilled person when reading the description, without departing the scope of the present invention.

The present invention is illustrated with the exemplary embodiments which follow, but which do not restrict the present invention.

Exemplary Embodiments

Below, exemplary embodiments of the present invention are compared with conventional methods for attaching edge bands to panellike workpieces, and also the edge-banded workpieces obtainable in this way. In particular, the method of the invention and the workpieces obtainable by this method are compared with methods which use heating of the adhesive layer by UV radiation, IR radiation, hot-air blowers, microwaves, and laser radiation, and the workpeces obtainable thereby.

In all of the tests, an edge band with a width of 3 cm and a length of 2 m is attached to the narrow, 2 cm wide face of a chipboard panel, and is subsequently milled flush.

In a first series of tests, the edge bands are first treated with an adhesion promoter (primer) and provided with one of two different commercial hotmelt adhesives from Jowat AG, of Detmold, Federal Republic of Germany (by knife coating, spraying, rolling, etc., for example). The remelting (activation) of the hotmelt adhesives, then takes place by means of UV radiation, IR radiation, hot-air blowers, microwaves or laser beams (comparison) or inventively by means of plasma irradiation.

Jointing takes place in an apparatus which corresponds to the diagrammatic representation shown in the single representation of the FIGURE; in other words, immediately before meeting the workpiece, the adhesive layer is heated to the heat-tacky state, and the edge band is then dressed onto the workpiece. The duration of the heating of the adhesive layer and the rate of advance of the workpiece are adjusted, depending on the nature of the energy source employed, in such a way as to achieve the best bonding results possible under the prevailing test conditions.

Subsequently, all of the tests are repeated again, but, as a difference, the edge band is not bonded or assembled; instead, immediately after the end of the supplying of energy, the temperature of the adhesive layer of the edge band is determined by means of an infrared recording.

In a further series of tests, but only in the case of an inventive procedure, use is made comparatively on the one hand of edge bands which are provided with hotmelt adhesives in the manner described above, and on the other hand of edge bands which have been produced by coextruding the edge band and the adhesive layer (i.e., without adhesion promoter or primer).

In the assessment of the economics of the method, the feasibility and flexibility of the methods and also the costs involved (e.g., acquisition costs and energy costs) were evaluated.

It is found that, when using an edge band provided with adhesive, only the methods with plasma activation or with activation by laser radiation of the adhesive layer are suitable for a machine through-flow process regime, since only they are able to heat the adhesive layer in a sufficiently short time (around 0.1 to 0.2 s) with the other methods, a rate of advance of only 5 m/min at most can be realized, and so they can only be carried out as stationary methods.

It is found, furthermore, that only by plasma irradiation, laser radiation, and the hot-air blower are sufficiently high temperatures achieved for a stable and permanent bond of the edge band with the workpiece. With the other methods, only temperatures of around 50° C. are achieved. In respect of the quality of the bond as well, the methods of plasma activation and laser activation of the adhesive layer are significantly superior to the other methods.

The method of the plasma activation of the adhesive layer, however, can be carried out with an even greater rate of advance than in the case of laser treatment, and from the standpoint of economics of the method is substantially more advantageous, since, first, the energy consumption for the plasma treatment is substantially lower and, second, the laser beam must always be tailored, expensively and inconveniently, to the thickness and nature of the adhesive layer.

Where an edge band produced by coextrusion with the adhesive layer is used for the plasma-activated bonding, the result is an even more robust and stronger bond, with a bondline that is no longer perceptible.

The results of the tests are compiled in Table 1 below.

TABLE 1

|  | UV lamp | | Plasma | | IR lamp | Hot air | | Micro-waves | Laser |
| --- | --- | --- | --- | --- | --- | --- | --- | --- | --- |
|  | metal | | | | | | | | Diode |
|  | halogen iron doped | Hg vapor | edge band + primer + adhesive | coextrusion of edge band and adhesive | | blower Temperature: 350° C. | | | laser (infrared, 808 nm) |
| Distance [cm] | 10 | 8 | 0.6 | 0.6 | 7 | 5 | 0.6 | 7 | —[1] |
| Speed [m/min] | 2-3 | 5 | 30 | 30 | 2-3 | 2-3 | 2-3 | 2-3 | 20-25 |
| Time [s] | 3 | 0.6 | 0.1 | 0.1 | 3 | 3 | 1 | 3 | 0.2 |
| Hotmelt A | about 50° C. | about 49° C. | about 114° C. | about 121° C. | about 52° C. | about 114° C. | about 55° C. | about 51° C. | about 108° C. |
| Hotmelt B | about 46° C. | about 48° C. | about 118° C. | about 124° C. | about 52° C. | about 105° C. | about 55° C. | about 54° C. | about 106° C. |
| Quality of bond[2] | 5-6 | 5-6 | 1-2 | 1 | 5-6 | 3-4 | 3-4 | 5-6 | 2 |
| Economics of method[2] | 5-6 | 5-6 | 1 | 1 | 5-6 | 3-4 | 3-4 | 5-6 | 2-3 |

[1]Laser radiation introduced via pivoting mirror
[2]Evaluation system according to school-grade system: "1 = very good" to "6 = inadequate"

The plasma source used for all of the tests is an Openair® system from the company Plasmatreat GmbH, of Steinhagen, Federal Republic of Germany. The temperature of the plasma is in each case around 650° C. when it leaves the nozzle, and around 400° C. at a distance of 6 mm.

The results of the series of tests are compiled in Table 1.

Additionally, the methods and the workpieces produced using them are also evaluated with regard to the quality of the bond and the economics of the method. To determine the quality of the bond, the peel strength of the bond, the water absorption by the bond, and the bondline were investigated.

The invention claimed is:

1. A method for attaching an edge band to at least one narrow face of an in particular panellike workpiece by jointing, said method comprising the following steps: the edge band is provided on its side to be joined to the workpiece with a heat activatable adhesive layer which is heated by irradiation prior to jointing;

wherein the heat-activatable adhesive layer is of plasma-activatable form, and wherein the heating of the heat-activatable adhesive layer takes place by means of plasma irradiation, where the plasma irradiation takes place by means of a plasma source having two or more plasma nozzles, where the temperature of the plasma is 200 to 1000° C. and/or where the plasma irradiation acts with an energy of 0.5 to 20 kWh on the plasma-activatable adhesive layer.

2. The method of claim 1, wherein said heat-activatable adhesive layer is provided with at least one energy-absorbing and/or thermally conducting substance.

3. The method of claim 1, wherein said edge band used is an edge band comprising a thermoplastic or thermoset or wood or paper or cardboard.

4. The method of claim 1, wherein said edge band used is an edge band comprising a thermoplastic or thermoset based on (i) polyolefins; (ii) polymethacrylates (PMA); (iii) polymethyl methacrylates (PMMA); (iv) polyvinyl chlorides (PVC); (v) polyvinylidene halides; (vi) acrylonitrile/butadiene/styrene copolymers (ABS); (vii) polyamides (PA); (viii) polycarbonates (PC); (ix) melamine-formaldehyde resins; (x) epoxy resins; (xi) phenolic resins or (xii) urea resins.

5. The method of claim 1, wherein said workpiece used is a workpiece of wood, wood substitutes, plastics or glass.

6. The method of claim 1, wherein the plasma-activatable adhesive layer comprises or consists of at least one hotmelt adhesive based on reactive or nonreactive hotmelt adhesives, where the plasma-activatable adhesive layer comprises or consists of at least one hotmelt adhesive based on olefins, polyamides, polyurethane elastomers, polyester elastomers, copolyamide elastomers and/or ethylene/vinyl acetate copolymers.

7. The method of claim 1, wherein the plasma-activatable adhesive layer possesses a thickness in the range from 0.1 to 200 μm.

8. The method of claim 1, wherein the plasma-activatable adhesive layer is applied at an amount in the range from 1 to 300 g/m$^2$.

9. The method of claim 1, wherein the providing of the edge band with the plasma-activatable adhesive layer takes place or has taken place by coextrusion.

10. The method of claim 1, wherein the energy-absorbing and/or thermally conducting substance of the adhesive layer is energy-absorbing and thermally conducting.

11. The method of claim 1, wherein the method is operated as a continuous method or else as a stationary method.

12. The method of claim 1, wherein the temperature of the plasma on emergence from the plasma nozzles is 300 to 900° C.

13. The method of claim 1, wherein the plasma irradiation acts with an energy of 1 to 10 kWh on the plasma-activatable adhesive layer and wherein the plasma irradiation is produced using a plasma source having an electrical energy consumption of 0.5 to 20 kWh.

14. The method of claim 1, wherein the plasma irradiation takes place by means of a plasma source having two or more plasma nozzles, the distance of the plasma source to the adhesive layer being set in the range from 0.5 to 20 mm.

15. A workpiece which has been provided on at least one of its narrow faces with an edge band, which workpiece is obtained by the method of claim 1.

16. An apparatus for attaching an edge band to at least one narrow face of a workpiece by jointing, where the apparatus comprises:
 at least one means for storing and dispensing an edge band,
 at least one energy source for heating an edge band,
 at least one pressing means for pressing an edge band against a narrow face of the workpiece, and
 at least one transport means for moving or transporting the workpiece;
 wherein the energy source is a plasma source, where the plasma source is capable of generating plasma temperatures of 200 to 1000° C. and/or an energy of 0.5 to 20 kWh and wherein the plasma source has two or more nozzles, where the nozzles are displaceable and where the nozzles are positionable and/or positioned between a narrow side of the workpiece and the edge band.

17. The apparatus of claim 16, wherein the nozzles are displaceable in all spatial directions.

18. The apparatus of claim 17, wherein the distance of the nozzles from the edge band can be set in the range from 0.5 to 20 mm.

19. The apparatus of claim 16, wherein the plasma source is capable of generating plasma temperatures on emergence from the nozzle(s) of 300 to 900° C.

20. The apparatus of claim 16, wherein the plasma source is capable of generating an energy of 1 to 10 kWh.

* * * * *